UNITED STATES PATENT OFFICE.

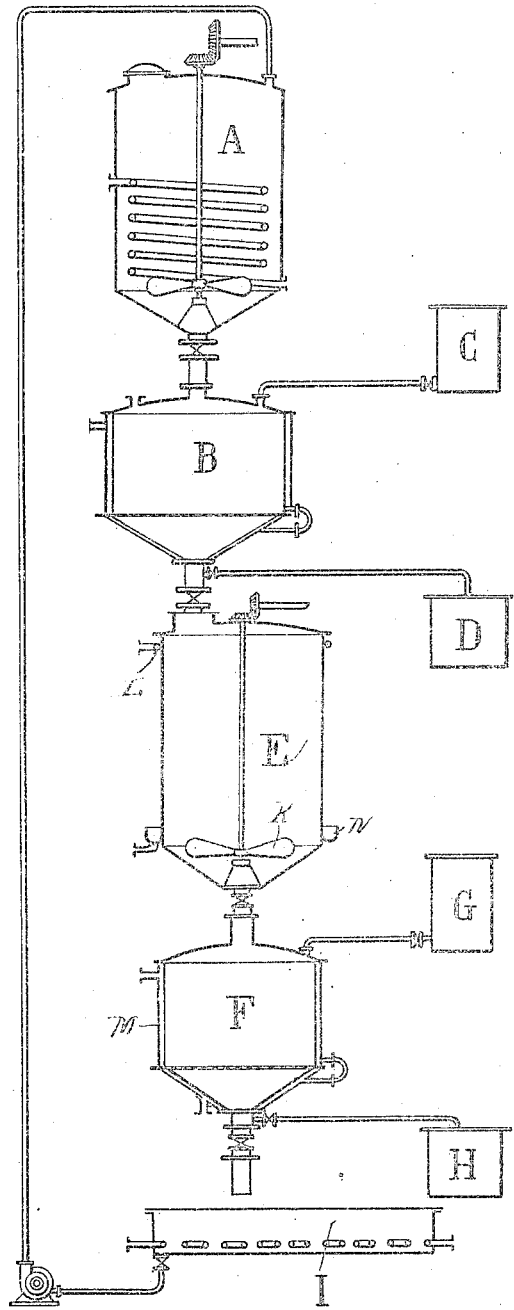

GERHARD NICOLAAS VIS, OF PARIS, FRANCE.

PROCESS OF RECOVERING AMMONIA BY MEANS OF SODIUM BISULFATE.

1,332,419.    Specification of Letters Patent.    Patented Mar. 2, 1920.

Application filed October 25, 1918. Serial No. 259,632.

*To all whom it may concern:*

Be it known that I, GERHARD NICOLAAS VIS, of 10 Rue de Vienne, Paris, France, chemist, have invented a new and useful Improved Process of Recovering Ammonia by Means of Sodium Bisulfate, which process is fully set forth in the following specification.

This invention relates to improvements in or modifications of the invention described in my copending application Serial No. 259,631 filed Oct. 25, 1918.

In the process described in that specification, it is said that after the splitting of the double salt $Na_2SO_4.(NH_4)_2SO_4.4H_2O$ into anhydrous sodium sulfate and ammonium sulfate, the mother liquors are returned into the working cycle either after concentration or after replacing the water which is added to the crude bisulfate.

In order to specify the working method a process is here described and an apparatus for carrying out the process which allows the double salt formed by the action of the ammonia upon the sodium bisulfate to be worked up in a simple and continuous manner; this salt being split up nearly quantitatively into anhydrous sodium sulfate and ammonium sulfate.

At the same time a description is given of the plant which may be used for the said process.

Assuming that the sodium bisulfate employed corresponds nearly to the formula $NaHSO_4$, the double salt $Na_2SO_4.(NH_4)_2SO_4.4H_2O$ is produced in the saturater through which the gases to be deprived of their ammonia pass. This salt is removed in the same manner as ammonium sulfate is removed in the usual process; it is then according to the process hereinafter described treated in the apparatus herein described and illustrated in the drawing.

A charge of 3,460 kgs. of the double salt, 1,280 kgs. of water plus water of crystallization 720 kgs., and 730 kgs. of ammonium sulfate is introduced into the receiver A.

The charge is heated to boiling point by the aid of a steam worm and all the ammonium sulfate present dissolves while a portion of the sodium sulfate is dehydrated and remains undissolved. The reaction is improved by thoroughly agitating with the stirrer K represented on the drawing.

When a temperature of 110° is attained, the content is delivered into a pressure filter B previously heated by steam at 1 to 2 kgs. pressure delivered into a casing which surrounds the walls and bottom of the filter.

Under pressure of air the liquid passes rapidly through the filter in which remains 575 kgs. of anhydrous sodium sulfate moistened with a saturated solution of ammonium sulfate which still contains a small portion of sodium sulfate. By covering the sodium sulfate once or twice with a nearly boiling and saturated solution of sodium sulfate a product is obtained from which by a single crystallization pure crystalline sodium sulfate is obtained. The washing solution is drawn from the reservoir C and is partially collected in the cooler E and partially in the reservoir D.

The saturated solution of ammonium sulfate flows into the cooler E where the solution is cooled to 62° C. by the aid of water circulating in a pipe L surrounding the upper portion of the outside of the cooler. This pipe is perforated, and the refrigerating water streams out of these holes and down the walls of the tank. The water is collected in trough N at the base of the receiver E. 480 kgs. of ammonium sulfate separate out together with 55 kgs. of sodium sulfate. This is delivered into a pressure filter F similar to the filter B and is heated prior to the filtration to about 60° C. by the passage of steam into the casing M surrounding it.

In the same manner as the sodium sulfate was washed in the filter B the ammonium sulfate is now subjected to one or two washings in the filter F, it being covered with a solution of ammonium sulfate saturated at 60° C obtained from the vessel G, whereby commercially pure ammonium sulfate is obtained; the wash waters flow partly into the receiver H and partly into the apparatus I.

The ammonium sulfate filtrate (which contains for the 2,000 kgs. of water always present 1,570 kgs. of ammonium sulfate and 790 kgs. of sodium sulfate) is concentrated in the apparatus illustrated at I until about 260 kgs. of water have been evaporated; the salts all remain in solution, and by the addition of about 1,250 kgs. of double salt from the saturater and about 100 kgs. of sodium sulfate previously removed from the quantity of 575 kgs. separated in the filter B the original sludge composed of 2,000 kgs. of water, 2,050 kgs. of ammonium sulfate and 1,420 kgs. of sodium sulfate is reconstituted; these latter salts being present for the most part in the form of double salt.

This addition of 100 kgs. of sodium sulfate is only indicated by way of illustration for the purpose of reconstituting the original sludge; the addition of sodium sulfate may be omitted without any change on the process, the sludge obtained being again treated as if the original sludge were in question.

As will be seen each charge renders about 1,000 kgs. of products, i. e. 465 kgs. of anhydrous sodium sulfate and 480 kgs. of ammonium sulfate. Sludges containing sodium sulfate or ammonium sulfate filter particularly well and the work takes place rapidly and simply. When the washing waters are exhausted they are mixed together and the double salt, which is again delivered into the working cycle, is obtained by crystallization.

By varying the quantities of sodium sulfate or of ammonium sulfate or of water in the original sludge the process may be adapted to sodium bisulfate of any composition, note being taken that 100 parts of water saturated with ammonium sulfate at about 110° C. dissolve 42.2 parts of sodium sulfate, and that the separation of the double salt in such a mixture then practically only commences at about 60° C., and lastly that the solubility of sulfate of ammonia in 100 parts of water decreases nearly regularly from 102 to 75 parts at temperatures from 110° to 50° C., the water being saturated with sulfate of sodium.

This description is only given by way of example so far as it relates to the quantities of material placed in the working cycle.

Claims:

1. The process of recovering ammonia by means of sodium acid sulfate consisting in subjecting sodium acid sulfate to the action of ammonia to form crystalline sodium ammonium sulfate, heating the resulting product with a solution of ammonium sulfate and separating the liquid portion from the residual sodium sulfate and reducing the temperature of said liquid portion to crystallize out ammonium sulfate.

2. The process as defined in claim 1 wherein the liquid separated from the said ammonium sulfate is concentrated and another portion of sodium ammonium sulfate and of sodium sulfate are added thereto to substantially restore the original composition and then repeat the cycle of steps.

In testimony whereof I have signed this specification.

GERHARD NICOLAAS VIS.

Witnesses:
 JOHN F. SIMONS,
 GASTON DE MESTRAL.